United States Patent [19]

Leon et al.

[11] 4,409,171

[45] Oct. 11, 1983

[54] METHOD OF DENSIFYING POWDERS

[75] Inventors: Gonzalo S. Leon; John E. Fraize, both of Sudbury, Mass.; Richard C. Fortier, University City, Mo.

[73] Assignee: Cabot Corporation, Boston, Mass.

[21] Appl. No.: 369,941

[22] Filed: Apr. 19, 1982

Related U.S. Application Data

[62] Division of Ser. No. 211,379, Nov. 28, 1980, Pat. No. 4,325,686.

[51] Int. Cl.³ .............................................. B29J 5/00
[52] U.S. Cl. ...................................... 264/120; 264/109
[58] Field of Search ................................ 264/109, 120

[56] References Cited

U.S. PATENT DOCUMENTS

| | | | |
|---|---|---|---|
| 2,642,013 | 6/1953 | Enoch | 425/371 |
| 2,994,917 | 8/1961 | Fritsch | 264/120 |
| 3,779,686 | 12/1973 | Kerttula et al. | 264/109 |
| 3,860,368 | 1/1975 | Kerttula et al. | 425/371 |

*Primary Examiner*—James R. Hall
*Attorney, Agent, or Firm*—Jack Schuman; Barry R. Blaker; Lawrence A. Chaletsky

[57] ABSTRACT

The invention comprises a method for densifying powders utilizing a pair of opposed gas-permeable belts arranged to either side of a common axis so as to define a generally convergent densifying zone between their adjacent faces. The belts are supported spanwise by a plurality of opposed spaced apart support rolls, each opposed pair of rolls defining a densifying station therebetween. The gas-permeable belts are driven toward the convergent end of the densing zone at substantially equal speeds while powder material to be densified is fed into the divergent end of the densifying zone at a rate sufficient to maintain a substantially complete fill thereof.

9 Claims, 4 Drawing Figures

METHOD OF DENSIFYING POWDERS

This is a division, of application Ser. No. 211,379 filed Nov. 28, 1980 and now U.S. Pat. No. 4,325,686.

BACKGROUND OF THE INVENTION

1. Field of the Invention

The present invention relates generally to powder densifying and is more particularly concerned with a method for densifying sub-micron powder materials of low apparent density.

2. Description of the Prior Art

Many materials of commerce are, as originally produced, in the form of light, fluffy and voluminous powders of low apparent densities. Exemplary of these are the so-called "fumed" metal and metalloid oxides produced by high temperature vapor phase oxidation or hydrolysis of compounds of the corresponding metals or metalloids. So too are the carbon blacks produced by any of the well-known furnace, thermal, plasma or channel processes. Such powder materials are normally first collected in the form of sub-micron powders having apparent densities of less than about 25 kg/m$^3$. In this very light and voluminous state these powder materials are expensive to package and ship since they occupy substantial volume per unit weight thereof. Too, the ultimate consumer of such powder materials often experiences difficulties in their handling and/or in their compounding into finished product formulations since, if not first densified, powder materials of low apparent densities tend to be dusty and tend to bridge hopper outlets, plug orifices, form unwanted deposits and cause other innumerable difficulties in their conveyance, metering and handling.

In an effort to resolve such difficulties it is common practice to subject sub-micron powder materials of low apparent densities to one or more various densifying treatments prior to their shipment or use. Of course, in the densifying of such materials, due precautions need be taken to prevent deleterious alteration of their desirable properties. For instance, it is usually important that densifying of such materials as fumed silicas and carbon blacks be undertaken in such manner that the dispersibility of the diversified powder product in the intended end item composition or formulation is not excessively deleteriously affected.

Carbon blacks find a major use as reinforcing agents in natural and synthetic rubber formulations. In this application, the end item rubber formulation is usually produced by mastication of the solid ingredients of the formulation, including the carbon black, into the elastomeric stock. The shear or mixing forces generated under typical rubber mastication conditions, such as is accomplished in roll mills or internal mixing equipments of the Banbury type, is generally of a sufficiently high order as to allow the carbon black manufacturer to supply the carbon black in a densified agglomerated or pelleted form without substantial degradation of the reinforcing properties of the carbon black. Carbon blacks also find extensive utility as black pigments in paints, enamels, lacquers and thermoplastics. In these applications, of course, the dispersion character of the carbon black is often of major importance. Failure to produce good and uniform dispersions of carbon blacks in these end items under conventional mixing conditions can seriously and adversely affect the desired properties thereof. Moreover, since the relatively large shear forces generated during the course of normal rubber compounding operations are generally not attainable in the preparation of liquid or thermoplastic carbon black dispersions, it is not normally possible in these applications to counter poor dispersion characteristics of a particular carbon black pellet batch simply by increasing mixing time or energy.

Two types of apparatus are conventionally employed in the preparation of pelleted carbon blacks. One type is basically a rotating drum having an inlet end and a discharge end. The "fluffy" carbon black powder, which may or may not be prewetted with water or other pelletizing agents, is charged into the inlet end of the drum and is caused to tumble about therein, thereby to coalesce the minute particles thereof into larger rounded agglomerates or pellets. The formed pellets, if wetted with water, are finished by drying thereof. Exemplary of such drum pelletizing apparatus is, for instance, that disclosed in U.S. Pat. No. 2,812,541, G. J. Webster et al., Nov. 12, 1957. Another type of apparatus for densifying and pelletizing carbon blacks comprises a static cylindrical enclosure, oriented slightly off-the-horizontal, which enclosure is equipped with a coaxial rotating shaft therethrough to which there are fixed a multiplicity of radially oriented pins. The lengths of said pins are such that the free ends thereof are located substantially adjacent the walls of the enclosure. The "fluffy" carbon black powder is charged into the higher end of the enclosure and, by rotation of the agitator shaft, the radial pins are continuously driven through the bed of carbon black, thereby densifying and coalescing same into pelleted form and, in most instances, aiding to drive the mass of carbon black towards the lower discharge end of the enclosure. As with the drum pelletizing apparatus mentioned previously, various liquid pelletizing agents can be, if desired, added to the agitating bed of black within the pin pelletizer apparatus and/or the black can be prewetted prior to its introduction into the cylindrical enclosure thereof. Pin pelletizers of this type are disclosed in such patent literature as: U.S. Pat. No. 3,390,424, R. J. Fortune, July 2, 1968; U.S. Pat. No. 3,891,366, Wilson H. Rushford, June 24, 1975 and U.S. Pat. No. 4,136,975, Glenn J. Forseth, Jan. 30, 1979. The resulting densified pellets from either of the foregoing types of apparatuses, while usually adequate for rubber reinforcement purposes, are nevertheless often possessed of some detrimental characteristics, certain of which can seriously affect their performance as pigments for liquid or thermoplastic compositions. For instance, it is often found that pelleted carbon black powders of the prior art can be of non-uniform density, either in terms of pellet-to-pellet densities or in terms of intra-pellet densities. As to this last, it is often found that the density of the exterior surfaces of carbon black pellets produced in either of the foregoing types of apparatus is substantially greater than that of the interiors or cores thereof. Too, pelletizing or densifying operations of the foregoing types are often difficult to control in view of the fact that pelleted product quality and uniformity is usually dependent upon maintenance of an accurate and continuous flow of the fluffy carbon black powder feed material into the inlet ends of the pelletizer apparatuses. As mentioned previously, it is normally difficult to control the flow of such light sub-micron powders with the degree of accuracy necessary to achieve good densified product uniformity.

Fumed sub-micron silicas find extensive commercial utility as reinforcing agents for polymers, particularly silicon rubber and as thickening or thixotropic agents for various liquids, particularly polyester gel coat resins and hydrocarbon oils. As with the fluffy carbon blacks, fumed silicas are also generally found to be dusty materials which are susceptible to electrostatic charge build-up and are difficult to handle, meter and convey. Accordingly, it is conventional to densify fumed silicas by vibratory treatment thereof in a holding bin preparatory to packaging for shipment. Somewhat further densification can be achieved by vacuum bagging. Where the fumed silica is intended to be employed as a silicone rubber reinforcing agent it can be subjected to a more rigorous densifying treatment. Said treatment, and the apparatus employed therefor, is disclosed in detail in the following patent literature, all of which is in the name of Helmut Reinhardt et al.; U.S. Pat. No. 3,838,785, June 12, 1973; U.S. Pat. No. 3,742,566, July 3, 1973; U.S. Pat. No. 3,762,851, Oct. 2, 1973 and U.S. Pat. No. 3,860,682, Jan. 14, 1975. Basically, the apparatus employed is a chamber housing a pair of rolls maintained in axial parallelism and which rolls are in a fixed, spaced apart association such as to define a narrow "nip" or gap therebetween. At least one of the rolls is composed of a gas-permeable material and the interior of the roll is placed in communication with a vacuum source. The fumed silica powder material is fed to the chamber and the rolls are operated in a counter-rotating manner, thereby to capture the fumed silica powder in the nip therebetween and to express air therefrom. Meanwhile, a vacuum is developed within those roll(s) comprising the porous gas-permeable surface(s), thereby continuously withdrawing air from the interstices of the silica particles as they are compressed in the nip of the rolls. The densified silica product of this type of apparatus, and the operations thereof, are also subject to certain deficiencies. Firstly, the densified silica product tends to be non-uniform in density across its cross-section, the greatest density being achieved at the surface(s) of said product adjacent the vacuum roll(s) and the least density tending to occur at the point farthest removed from the vacuum roll(s). Secondly, while in utilizing such apparatuses it is said to be possible to achieve densification to a level of about three or four times that of the original apparent density of the fumed silica powder feed, even greater levels of densification, consistent with maintenance of good silicone rubber reinforcement properties, would be desirable. Finally, the operations of such apparatus are relatively expensive, particularly at densifying rates attractive for commercial operations. This is so because the vacuum equipments needed to handle the large rates of gas removal required from the fluffy fumed silica powder feed represent a relatively large capital expense and because such vacuum equipments normally require considerable maintenance and upkeep.

In accordance with the present invention, however, the above and other problems attendant the densification of voluminous sub-micron powder materials of low apparent density have been vastly ameliorated or substantially eliminated.

OBJECTS OF THE INVENTION

It is a principal object of the invention to provide a novel method for densifying powder materials.

It is still another object of the invention to provide a method for densifying sub-micron powder materials of low apparent densities.

It is another object of the invention to provide a method for densifying powder materials, which method is characterized by its efficient use of energy.

It is another object of the invention to provide a method for densifying sub-micron powder materials of low apparent densities wherein the uniformity of the finished densified product is improved.

It is another object of the invention to provide a method for preparing densified sub-micron powder materials of superior uniformity in terms of particle-to-particle and intra-particle density.

It is another object of the invention to provide a method for densifying fumed silica powder materials having apparent densities of not greater than about 25 kg/m$^3$ and wherein the densified fumed silica product suffers no substantial derogation of its reinforcing properties in polymers and, in particular, in silicone rubbers.

Other objects and advantages of the present invention will in part be obvious and will in part appear hereinafter.

SUMMARY OF THE INVENTION

In its broadest aspect, the apparatus of the invention comprises a multiplicity of support rolls arranged, as opposed spaced parallel pairs thereof, to either side of a common axis. Each said pair of spaced rolls defines a densifying station separate and apart from other pairs thereof. The spacing between the rolls of each pair is serially decreased from station to station. Two gas-permeable belts are individually reeved, respectively, over the rolls of one or the other side of said common axis, said belts together defining a generally convergent densifying zone between the adjacent opposed faces thereof and being supported spanwise essentially only by said rolls. The convergent densifying zone is enclosed, such as by means of side plate members which sealingly coact with the edges of the gas-permeable belts. Drive means are provided to drive each of the gas-permeable belts towards the convergent end of the densifying zone and at essentially equal speeds. Feed means are included to introduce powder material to be densified into the divergent end of said densifying zone, said feed means being operative to maintain a substantially complete fill of said densifying zone during densifying operations.

The process of the invention broadly comprises feeding a powder material to be densified into the divergent end of apparatus of the foregoing description, driving each of the gas-permeable belts such that the opposed adjacent surfaces thereof are caused to move toward the convergent end of the densifying zone at essentially equal speeds, collecting densified powder product from the convergent end of said densifying zone and maintaining the feed of said powder material into said densifying zone at a rate sufficient to maintain a substantially complete fill thereof.

DESCRIPTION OF THE PREFERRED EMBODIMENTS

Figure 1:
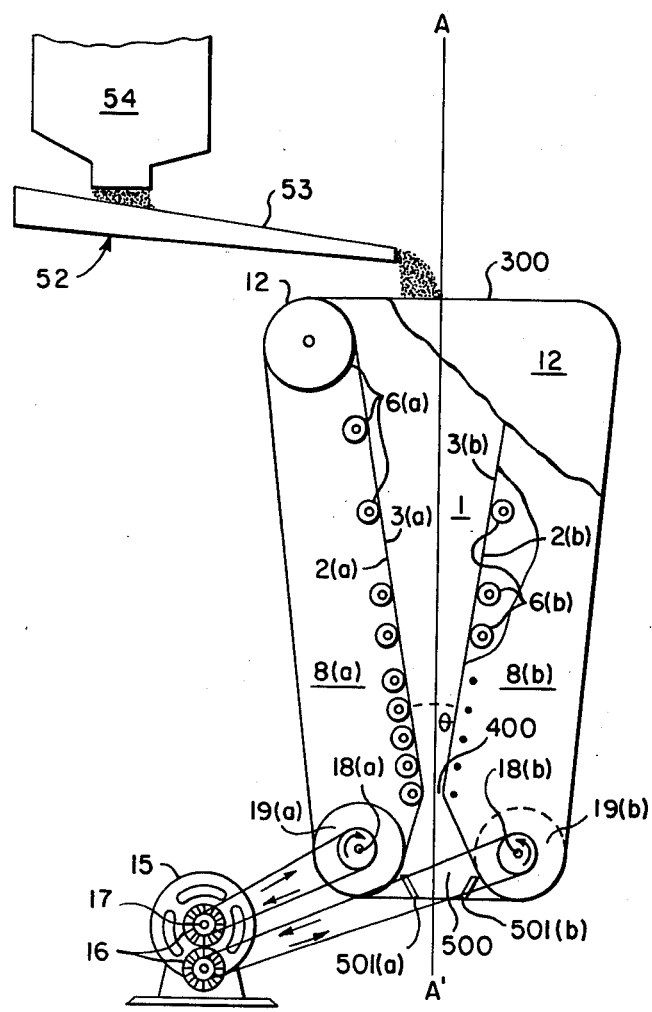
FIG. 1 is a schematic, diagrammatic, partially sectional side view of apparatus in accordance with the invention.

Referring now to FIGS. 1 through 4, wherein like reference numerals refer to like structures, the apparatus of the present invention broadly comprises a pair opposed, gas-permeable continuous belts 2(a) and 2(b), respectively, which belts are spaced to either side of a common axis A—A such as to define a generally convergent densifying zone 1 therebetween. The gas-permeable belts 2(a) and 2(b) are each reeved over a multiplicity of journalled support rolls 6(a) and 6(b) therefor such that said belts are each multiply supported spanwise essentially only by said rolls along the convergent zone 1. In this, it is to be noted that, with the exception of the spaces between the last two or three spaced apart, opposed, parallel pairs of rolls 6(a) or 6(b), the presence of any static support members located behind and supporting the belts 2(a) and 2(b) is otherwise avoided. This is so because such static support members would necessarily accomplish their belt support functions in a manner which generates friction as the belts 2(a) and 2(b) pass thereover. Where the contact area of such static support with the belts is substantial, the frictional forces which can be developed therebetween can be relatively high. Not only would such a support arrangement represent a source of belt wear, but it would also represent an important inefficiency in terms of the power required to operate the apparatus. In the construction of the present invention, however, the power of the prime mover is effectively utilized in running the belts 2(a) and 2(b) and only a small portion thereof need be employed merely to overcome sliding friction of the belts against static support members therefor. The support rolls 6(a) and 6(b) are arranged as opposed parallel, spaced apart pairs thereof, the spacing or gap between the rolls 6(a) and 6(b) forming each said opposed pair being serially decreased from the divergent feed end 300 of said convergent densifying zone 1 to the convergent discharge end 400 thereof. Each pair of opposed spaced apart support rolls 6(a) and 6(b) defines a separate and distinct densifying station apart from other pairs thereof. Thus, since the overall densification of the powder material in the apparatus of the invention in effect involves a multiplicity of distinct and incrementally more stringent densifying steps, it is generally preferred that the number of densifying stations provided be at least eight. In the case of sub-micron powder material feeds of low apparent densities, i.e. on the order of 25 kg/m³ or less, it is preferred that the number of densifying stations be at least ten. Desirably, but not necessarily, the linear spacing along common axis A—A between the opposed pairs of support rolls 6(a) and 6(b) will also be serially decreased from the divergent end to the convergent end of said convergent zone 1. This preferred serial decrease in linear spacing between pairs of support rolls 6(a) and 6(b) arises from the fact that the stresses imposed upon belts 2(a) and 2(b) during operations of the apparatus of the invention tend to increase markedly as the powder material is advanced through the convergent densing zone 1.

These forces are at a maximum just prior to discharge of the densified powder product from the discharge end 400 thereof. In turn, the increases in densifying stresses are generally brought about by the rapidly decreasing ratio in the volume of gas to the volume of solid particles in the powder material advancing through the convergent densifying zone 1. By this is meant that the powder material advances through a densifying station its gas content is reduced by expression through the gas-permeable belts 2(a) and 2(b). Thus, each subsequent densifying station receives a powder feed of diminished gas volume and increased solid particle density relative to that experienced at prior densifying stations. Of course, for any densifying station of a given gap, the less the proportion of gas to solid particles in the powder material fed thereto, the greater will be the densifying stresses applied to the belts and support rolls thereof. Thus, it is desirable that these densifying stresses be relatively evenly distributed throughout the apparatus and this is fostered by decremental spacing of the densifying stations. Similarly, it is also beneficial that the reduction in gap between opposed rolls 6(a) and 6(b) of each densifying station be limited such that said reduction be no greater than about 25% of the gap of the preceding densifying station. For purposes of the present invention, the term "gap," as used herein, refers to the least dimension between the circumferential surfaces of a pair of support rolls defining a densifying station.

In dealing with extremely light, voluminous sub-micron powder materials, such as fumed silicas or carbon blacks having apparent densities of less than about 25 kg/m³, it is important that the included angle, $\theta$, defined by convergent densifying zone 1 not be excessive, since, if excessive, commercially attractive densifying rates will not normally be achievable without danger of generation of a deleterious pneumatic build-up within the densifying powder material passing through the convergent densifying zone 1. Such pneumatic buildup can be generated at high belt speeds and densifying rates to such an extent as to cause backflow of at least a portion of the powder material towards the divergent feed end 300 of convergent densifying zone 1, thereby to deleteriously affect densifying efficiency and uniformity. This phenomenon occurs when the densifying rate or throughput of the apparatus exceeds the gas handling capacity of the gas-permeable belts 2(a) and 2(b) employed; in other words, the inter-particle gases existing in the densifying powder material cannot be expressed quickly enough through said gas-permeable belts 2(a) and 2(b). This problem, however, can be largely eliminated or at least very much reduced where the included angle of convergency, $\theta$, of zone 1, in terms of both its overall length and as between any two adjacent densifying stations thereof, is limited to no greater than about 10°. Too, by so limiting the angle of convergency of said zone 1, the tensile stresses imposed upon the driven gas-permeable belts 2(a) and 2(b) are minimized and the densifying forces applied to the powder material are directed more nearly in a state of plane strain, these factors being desirable from the standpoints of the service lives of belts 2(a) and 2(b) and the power required to drive them and from the standpoint of densifying efficiency.

Figure 3:
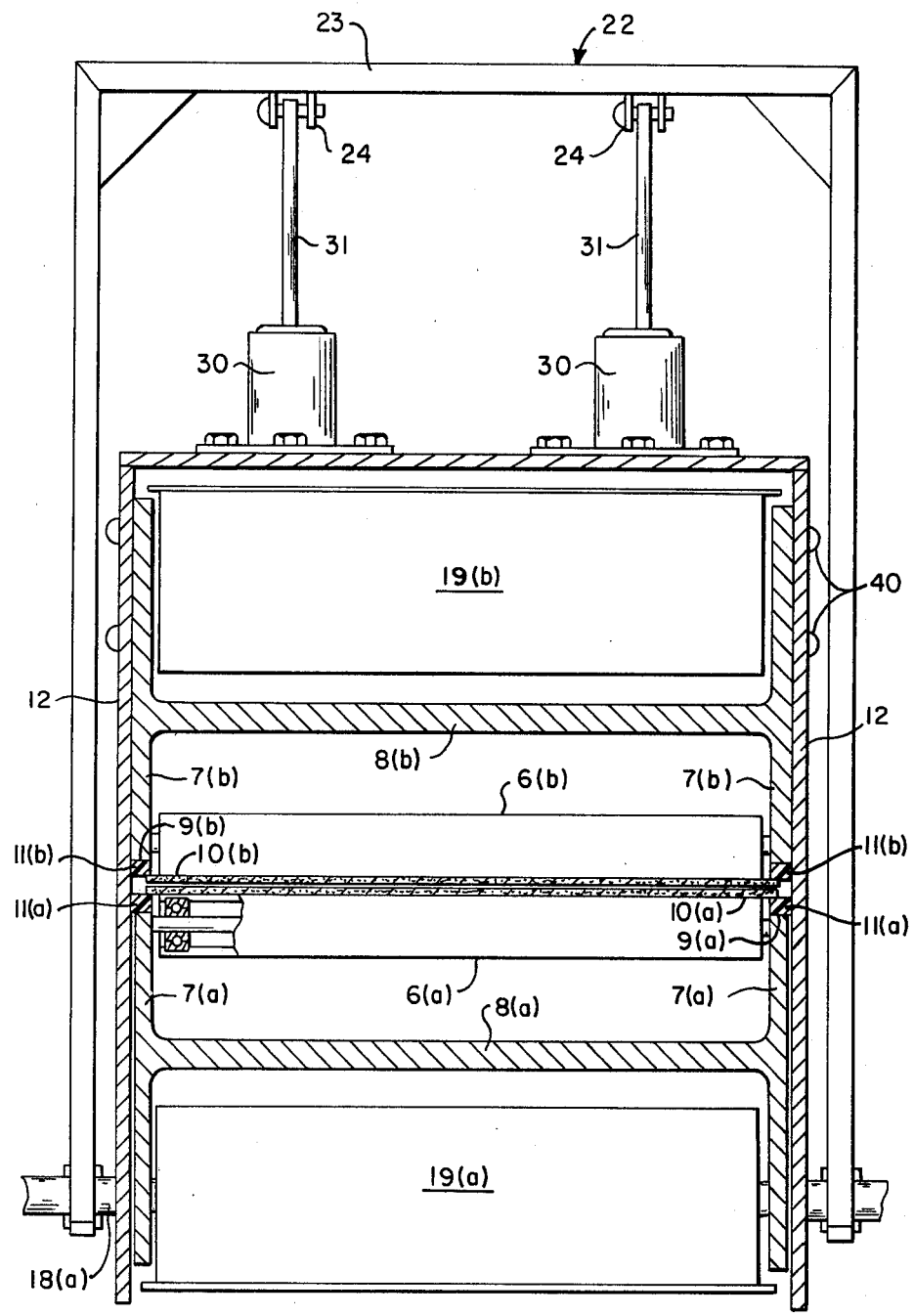
FIG. 3 is a schematic, diagrammatic sectional top view of the apparatus of FIG. 2 taken through lines 2—2' thereof.

It is, of course, further required that an enclosure means be provided whereby any substantial spillout of the powder material from the convergent densifying zone 1 is avoided. The details of one generally suitable enclosure means are depicted in FIG. 3 hereof. Referring now to said FIG. 3, the support rolls 6(a) and 6(b) are seen to be journalled between the interior opposed flanges 7(a) and 7(b) of H-frame members 8(a) and 8(b) in such manner that the circumferential surfaces of said rolls 6(a) and 6(b) are exposed beyond the edge margins 9(a) and 9(b) of said flanges 7(a) and 7(b). The widths of gas-permeable belts 2(a) and 2(b) are somewhat greater than the spans of rolls 6(a) and 6(b) such that free edges 10(a) and 10(b) of belts 2(a) and 2(b) result and extend beyond the ends of the rolls 6(a) and 6(b). Rub strips, 11(a) and 11(b), which are continuous throughout the length of convergent densifying zone 1, are affixed to the edge margins 9(a) and 9(b) of flanges 7(a) and 7(b) of frame members 8(a) and 8(b). These rub strips 11(a) and 11(b) are composed of a smooth, hard, low friction material, such as high density polyethylene material and are of sufficient thickness as to fill the gap between each of the edge margins 9(a) and 9(b) and the free edges 10(a) and 10(b) of belts 2(a) and 2(b). By this construction, therefore, there is formed a sealing engagement between the belts 2(a) and 2(b) and the rub strips 11(a) and 11(b). Completion of the closure arrangement for convergent densifying zone 1 is made by the provision of a pair of sideplate members 12 which are held adjacent the exteriors of flanges 7(a) and 7(b).

Referring now to FIG. 1, each of the belts 2(a) and 2(b) is driven by a prime mover 15 such that the opposed belt surfaces 3(a) and 3(b) are advanced toward the convergent end of densifying zone 1 at essentially equal speeds. This can be achieved, for instance, by suitable gearing 16 between the output shaft 17 of prime mover 15 and the drive shafts 18(a) and 18(b) of drive rolls 19(a) and 19(b). It should be understood, however, that the invention is not intended to be limited to the specific belt driving arrangement shown in said FIG. 1 since many suitable alternative arrangements, including use of two synchronized direct drive prime movers, each driving one of the pair of gas-permeable belts 2(a) and 2(b), will suggest themselves as obvious equivalents to those skilled in the art.

The gas-permeable belts 2(a) and 2(b) can be constructed of substantially any suitable textile material having adequate permeability with respect to gas flow therethrough but which material is sufficiently impermeable with respect to the powder material to be densed as to prevent passage thereof. Further, of course, the materials for belts 2(a) and 2(b) require adequate strength and durability for use as driven elements under substantial loads. Such gas-permeable belting materials are known and can comprise, for instance, suitable reinforced woven cotton or cotton-polyester fabrics. Bearing the above considerations in mind, one of skill in the art to which this invention pertains can select appropriate belt materials based upon the particular powder material to be densified, the extent of densifying treatment desired and the design parameters of the apparatus relating to throughput.

Figure 2:
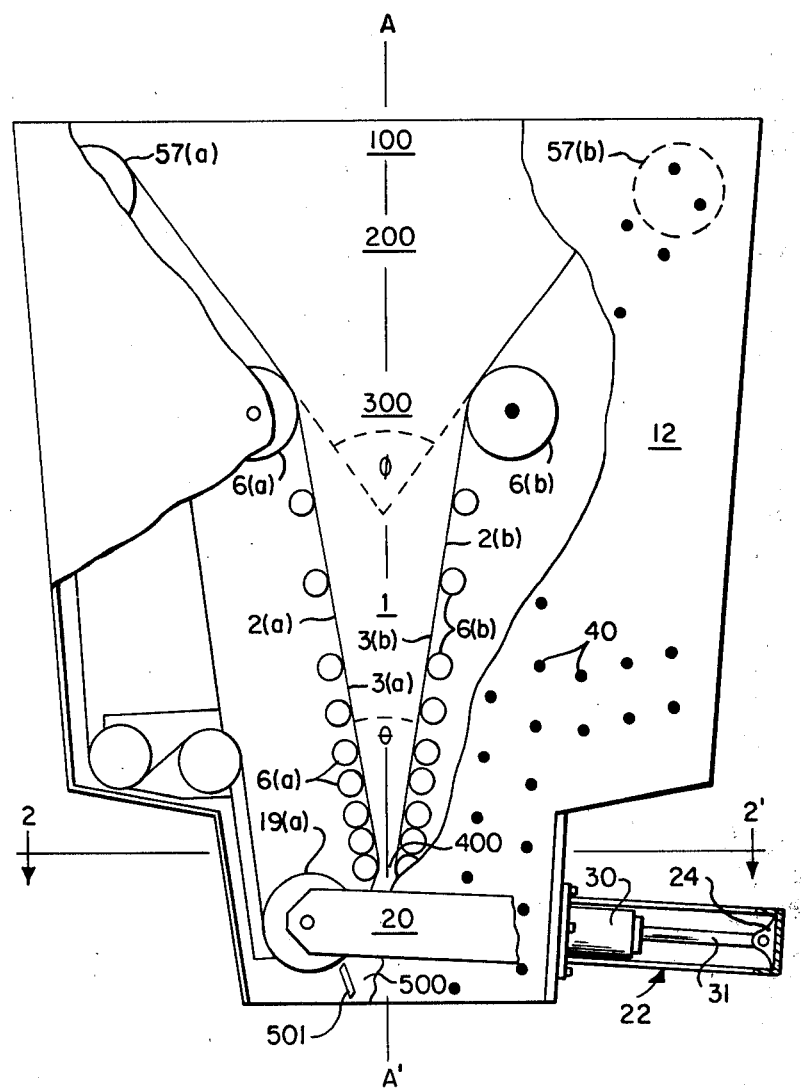
FIG. 2 is a schematic, diagrammatic, partially sectional side view of apparatus in accordance with the invention bearing certain preferred embodiments thereof.
Figure 4:
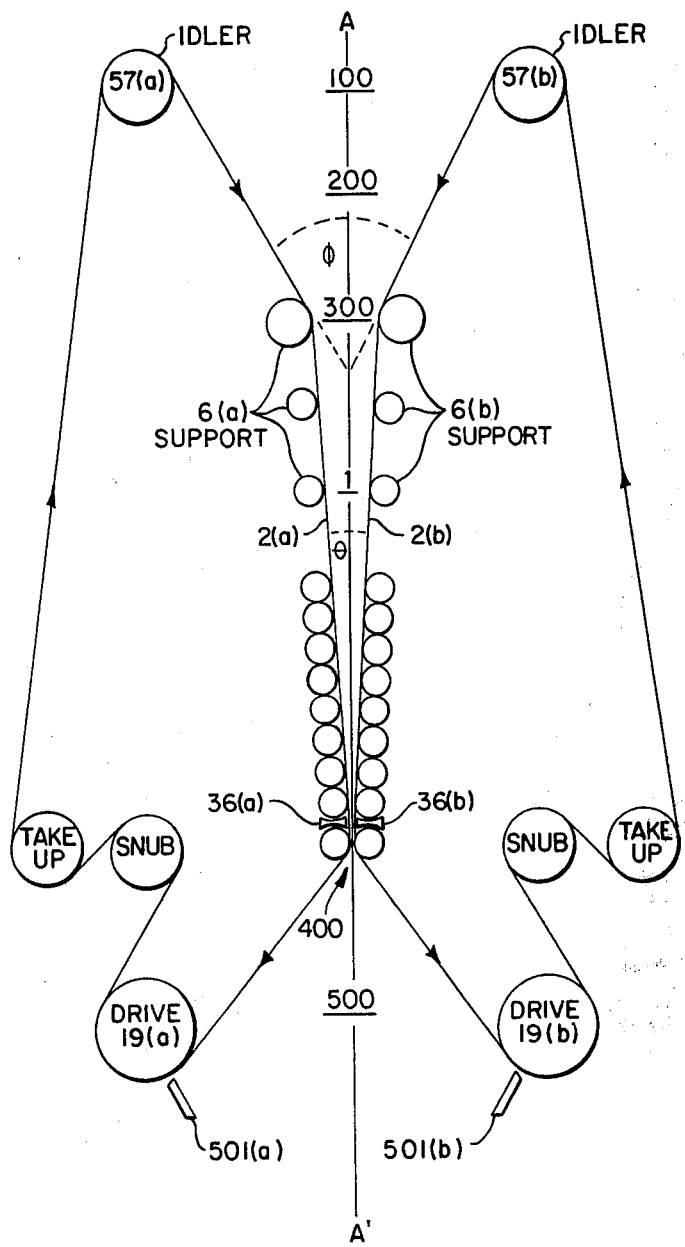
FIG. 4 is a schematic, diagrammatic side view of a preferred support roll layout and a typical suitable belt reeving diagram for use in the apparatus of the invention.

In order that the uniformity of the densifying accomplished by the apparatus of the present invention be maximized it is important that said apparatus be provided with a feed means by which convergent densifying zone 1 is maintained at a substantially complete fill during operations. In the apparatus of FIG. 1, said feed means takes the form of a vibratory trough feeder 52, the vibratory trough 53 thereof being itself fed from a powder storage hopper 54. Control of the rate of powder fed into the divergent end of convergent densifying zone 1 utilizing a feed means of this type can usually be had by controlling the frequency and/or amplitude of vibration of the trough 53 and/or by control of the angle of depression of said trough 53. For many powders of interest a relatively simple feed means, separate and distinct from but associated with the densifying apparatus of the invention, (such as shown schematically in FIG. 1) will be found adequate to maintain a substantially complete fill of convergent densifying zone 1. However, for sub-micron powder feeds of low apparent densities, feed means conventional in the art of powder conveyance, such as screw conveyors, gravity drop hoppers or vibratory feeders, may be found difficult to operate so as to achieve a uniform rate of feed to the convergent densifying zone 1. In FIGS. 2 and 4 hereof there is depicted an arrangement whereby the conveyance of sub-micron powder materials of low apparent density into convergent densifying zone 1 in a manner such as to assure maintenance of a complete fill thereof is facilitated. Referring now in particular to FIG. 2, it will be first seen that the densifying apparatus of the invention is oriented to place convergent zone 1 in a substantially vertical posture with the divergent feed end 300 thereof uppermost. Such substantially vertical orientation of the densifying apparatus of the invention is itself beneficial in that it takens advantage of the force of gravity in aiding the conveyance of powder material into the convergent densifying zone 1 and in maintaining a substantially complete fill thereof. Located immediately above the divergent end 300 of said densifying zone 1 and integral therewith is a relatively more widely convergent feed zone 200, said integral feed zone 200 being defined by continuation of the pair of belts 2(a) and 2(b) to essentially equal, but substantially greater, lengths than necessary simply to define the convergent densifying zone 1. The bottom of feed zone 200 is also regarded as the feed end 300 of convergent densifying zone 1 and is defined by the uppermost pair of opposed support rolls 6(a) and 6(b) of convergent densifying zone 1. The feed end 100 of feed zone 200, on the other hand, is defined by a pair of opposed idler rolls 57(a) and 57(b) which are spaced at a substantially greater distance apart than that of the uppermost of the pairs of rolls 6(a) and 6(b), and which idler rolls, in addition, are spaced at a linear distance above the uppermost pair of rolls 6(a) and 6(b) as to define a convergent feed zone 200 having an included angle, $\phi$, substantially greater than angle $\theta$. Gas-permeable belts 2(a) and 2(b) are in this embodiment of the invention, and as best shown in FIG. 4, reeved generally over their respective drive rolls, 19(a) and 19(b), support rolls 6(a) and 6(b), and idler rolls 57(a) and 57(b), thereby to establish the relatively widely convergent feed zone 200 which is integral with and feeds the substantially more narrowly convergent densifying zone 1. Since the major functions of feed zone 200 are to preliminarily partially degas the powder material feed and to charge same into convergent densifying zone 1, the forces acting upon the gas-permeable belts 2(a) and 2(b) within said feed zone 200 will normally be relatively quite low. Therefore, it will usually be found unnecessary to provide said belts with additional spanwise support rolls therefor within said zone 200 although such provision may be made if desired.

The presence of such a widely convergent feed zone 200 markedly reduces the burden of maintaining a substantially complete fill of the more narrowly convergent densifying zone 1, particularly where extremely light and fluffy sub-micron powder material feeds of no more than about 25 kg/m$^3$ apparent densities are to be densified. Said feed zone 200 ameliorates the effects of minor bridging of powder feed devices and other temporary obstructions or perturbations of flow of powder material into the densifying apparatus of the invention and thus aids in maintaining the substantially complete fill of convergent densifying zone 1 essential to good densified product uniformity. It will be seen, of course, that in order to maintain such substantially complete fill of the densifying zone 1 utilizing the apparatus of FIGS. 2 or 4, it is only necessary to control the flow of powder material from the feed means into the feed end 100 of feed zone 200 to the extent of maintaining at least some fill thereof rather than requiring the more rigorous and difficulty attainable standard of maintaining a substantially complete fill thereof.

Another preferred embodiment of the invention resides in the provision of means by which the densifying forces applied by at least the latter densifying stations of the apparatus are maintained despite changes which may occur in the apparent density of the feed powder material. This, in turn, can be accomplished by suitable adjustment during operations, responsive to such changes, of the "gap ratio" which term, for purpose of the present invention, is defined as the numerical quotient of the gap between the most widely spaced pair of support rolls 6(a) and 6(b) of convergent densifying zone 1 divided by the gap between the most narrowly spaced pair of support rolls at discharge end 400 thereof. As will be appreciated, the overall densifying of a starting powder material feed of constant apparent density will, in major part, be dictated by the aforementioned gap ratio. However, in the case of a submicron powder material feed it will often be the case that the apparent density of the material fed to the densifying apparatus will not, in fact, be uniform. Under these circumstances, maintenance of a constant gap ratio during densifying operations will generally result in a densified product whose apparent density will vary in response to variations in apparent density of the starting powder material feed. In addressing this problem, it is much preferred that the apparatus of the invention include means by which the gap ratio is adjusted in response to changes in apparent density of the powder material feed, thereby to assure that the overall densifying forces applied to the densifying powder material are maintained at least relatively constant. This of course, results in a densified powder product of improved uniformity over a similar densified product wherein the gap ratio of the apparatus is fixed. Referring now to FIGS. 2 and 3, there appears a suitable arrangement by which such gap ratio adjustment can be effectuated. Therein, frame members 8(b), carrying all support rolls 6(b), are rigidly affixed to each of the pair of side plate members 12 associated therewith such as by means of a plurality of fasteners 40. The frame members 8(a), on the other hand, carrying all support rolls 6(a), are pivotally journalled to said pair of side plate members 12 about that support roll 6(a) located at the feed end 300 of convergent densifying zone 1, thereby allowing said frame members 8(a) to swing to and fro between the side plate members 12 and to thereby allow adjustments of the gap between that pair of rolls 6(a) and 6(b) at discharge end 400 while maintaining the gap between that pair of rolls 6(a) and 6(b) at feed end 300 constant. Further, in this regard, the drive shaft 18(a) of drive roll 19(a) is carried through slots (not shown) provided in each of the side plate members 12. The extended portions of the shaft 18(a) are journalled in the side arms 20 of a yoke 22. Constant force producing means, such as a pair of hydraulic cylinders 30, are affixed equidistantly to either side of the midline of the back of the rigid frame member 8(b)/side plate member 12 arrangement. The working ends of the hydraulic cylinder ram members 31 are pinned to clevises 24 of transverse yoke member 23. In operations, hydraulic pressure is applied equally to cylinders 30, thereby to cause the ram members 31 thereof to stroke with equal force toward the top of the drawing and to transmit their respective forces, through yoke 22 and shaft 18(a), to the lower portion of pivotally mounted frame member 8(a). This action, of course, yieldingly urges the support roll(s) 6(a) of the densifying stations located near the discharge end 400 of convergent densifying zone 1 towards their closed condition with respect to their corresponding opposed roll(s) 6(b). Due to the densifying powder material passing through the apparatus the gap between the rolls of the station defining the discharge end 400 of convergent densifying zone 1 will not normally achieve full closure but rather will continuously adjust itself under the urging of the activated hydraulic cylinders 30 so as to maintain at least relatively constant densifying against the powder material coursing through the lowermost densifying stations. Where the density and flow of the powder material feed through convergent densifying zone 1 is constant, the gap at the last densifying station will also tend to establish itself as essentially constant, thereby to also establish the aforementioned gap ratio as essentially constant. However, where the apparent density of the powder material feed charged to the apparatus or the flow thereof is subject to change said gap, and the gap ratio, will responsively adjust themselves thereto, thus preserving constancy of densifying forces thereagainst and providing a densified product of improved uniformity. Obviously, the gap ratio adjustment arrangement disclosed above need not take the specific form of FIGS. 2 and 3, it being obvious that many changes and modifications thereof may be had once the principles of operations and intended effects thereof are fully understood. For instance, suitable alternative constant force applying means may also take the forms of pneumatic rams, counterweights, springs, electromechanical feedback controls and the like and need not comprise hydraulic cylinders as specifically shown. Moreover, suitable arrangements of the frame members and side plate members other than that specifically shown and described can also be readily had by which adjustment of the gap ratio can be effectuated.

Another preferred embodiment of the invention resides in the provision of a divergent disengagement zone 500 which is integral with the discharge end 400 of convergent densifying zone 1. This embodiment of the invention is depicted in FIGS. 1, 2 and 4 hereof wherein it is seen that immediately following the last pair of support rolls 6(a) and 6(b) which define said discharge end 400, the gas-permeable belts 2(a) and 2(b) are each extended and carried at sharply divergent angles to below said discharge end 400 and are then reeved about more widely spaced drive rolls 19(a) and 19(b), thereby to define the integral divergent disengagement zone 500. The presence of said divergent disengagement zone 500 aids in separation of the densified powder product from the opposed facing surfaces 3(a) and 3(b) of the gas-permeable belts 2(a) and 2(b). Further in this regard, it may also be found helpful to additionally provide doctor blades 501(a) and 501(b) running spanwise between side plate members 12 and which doctor blades are fixed in working association with the belt surfaces 3(a) and 3(b) passing over drive rolls 19(a) and 19(b). Said doctor blades 501(a) and 501(b) serve to continuously remove accreted densified powder product from the surface 3(a) and 3(b) of belts 2(a) and 2(b).

Yet another preferred embodiment of the invention resides in the provision of essentially equal gaps in the two or three final sequential densifying stations of convergent densifying zone 1. Where the powder material feed is subjected to two or more passes sequentially through two or more equally, but minimally gapped, final stations, the apparent density of the densified product is maximized. Accordingly, in the embodiment of the invention depicted in FIG. 4, the gaps between the last two pairs of rolls 6(a) and 6(b) are seen to be essentially equal, thereby to have the practical effect of subjecting the powder material passing through convergent zone 1 to two passes through the final, minimally gapped, densifying station. Advantageously, the gas-permeable belts 2(a) and 2(b) are also substantially continuously supported spanwise throughout their respective passages between the final, equally gapped, densifying stations. This can be accomplished by the provision of smooth, stiff support members 36(a) and 36(b) oriented spanwise and which essentially fill the spaces between the interior most circumferential surfaces of rolls 6(a) and the rolls of 6(b) of the equally spaced final densifying stations, thereby to provide, in cooperation with said support rolls, substantially continuous spanwise support surfaces for the belts 2(a) and 2(b) as they pass through said final densifying stations. Said support members 36(a) and 36(b) act to prevent pillowing of the gas permeable belts 2(a) and 2(b).

Utilizing densifying apparatus and procedures in accordance with the above description, a rubber reinforcing grade of sub-micron fumed fluffy silica having an apparent density of about 2.3 lbs/ft$^3$ (37 kg/m$^3$) was densified, in separate runs, to apparent densities of about 5.2 lbs/ft$^3$ (83 kg/m$^3$) and about 11.8 lbs/ft$^3$ (189 kg/m$^3$), respectively. The fluffy and two densified silica products were then each compounded under standard conditions and at two loadings, into separate batches of a heat cured silicone rubber composition based on a methyl vinyl siloxane gum, the two separate loadings of the silicas being 10 and 30 percent, respectively, based on the weight of the gum. The resulting silica-reinforced silicone rubber composition samples were then molded into tensile bars and mold cured for about 10 minutes at 290° F. followed by removal from the mold and further curing thereof for about 4 hours at about 300° F. The cured tensile bar samples were then subjected to hardness, tear, tensile, modulus, compression set and clarity tests utilizing art-recognized test procedures. Within each of the groups of samples containing equal silica loadings, no substantial differences in any of the tested properties were noted. Said lack of substantial differences in these several cured rubber properties indicates that the densifying treatments of the fluffy silica, even though the most stringent thereof increased the apparent density thereof by a factor of about 5, had little or no effect upon the dispersibility characteristics of the product silicas under standard silicone rubber compounding conditions.

Similar tests were conducted utilizing the two densified silica products at 10 to 20 weight percent loadings in each of a vinylacetate-ethylene copolymer formulation and an EPDM rubber formulation. Again, physical testing of the resulting silica-loaded polymer compositions indicated only insubstantial differences, if any, in the reinforcement properties of the densified silica products even though the more stringently densified silica product had an apparent density of about twice that of the less stringently densified silica product.

While this invention has been described hereinbefore with respect to certain embodiments thereof, it is not intented to be limited thereto, and it should be understood that variations and modifications which are obvious to those skilled in the art may thus be made without departing from the essential spirit or scope thereof.

The embodiments of the invention in which an exclusive property or privilege is claimed are defined as follows:

1. A method for densifying powder materials which comprises: providing an enclosed convergent densifying zone having a divergent feed end, a convergent discharge end and an angle of convergency, $\theta$, said zone being defined by a pair of opposed gas-permeable belts supported spanwise by a plurality of spaced apart support rolls arranged in opposed parallel pairs, each said pair of rolls having a gap therebetween defining a distinct densifying station; driving said belts toward the convergent discharge end of said zone at essentially equal speeds; feeding powder material to be densified into the divergent feed end of said zone at a rate sufficient to provide and maintain an essentially complete fill thereof and recovering densified powder material product discharged from the convergent discharge end of said zone.

2. The method of claim 1 wherein the apparent density of the powder material fed to said convergent densifying zone is no greater than about 25 kg/m$^3$ and the gap ratio, defined as the numerical quotient of the gap between the most widely spaced pair of support rolls of the densifying zone divided by the gap between the most narrowly spaced pair of support rolls thereof, is adjusted to result in a densified product having an apparent density of at least about 100 kg/m$^3$.

3. The method of claim 1 wherein the angle of convergency, $\theta$, of said convergent densifying zone is no greater than about 10°.

4. The method of claim 1 wherein said convergent densifying zone is oriented substantially vertically, the divergent feed end thereof being uppermost.

5. The method of claim 1 wherein the discharge end portion of at least one of the pair of belts is relatively movable toward and away from the corresponding discharge end portion of the opposed belt and the gap ratio, defined as the numerical quotient of the gap between the most widely spaced pair of support rolls of the densifying zone divided by the gap between the most narrowly spaced pair of support rolls thereof, is continuously adjusted by yieldingly urging said discharge end portion of said relatively movable belt with constant force toward said opposed belt.

6. The method of claim 1 wherein said feeding of said powder material is undertaken by providing a convergent feed zone integral with the divergent feed end of said convergent densifying zone, said convergent feed zone having an angle of convergency, $\phi$, substantially greater than the angle of convergency, $\theta$, of said densifying zone and being defined by a pair of opposed gas-permeable belts; driving said opposed pair of gas-permeable belts of said feed zone toward the convergent end thereof at essentially equal speeds and feeding powder material to be densified into the divergent end of said convergent feed zone at a rate sufficient to maintain an at least partial fill thereof.

7. The method of claim 6 wherein said gas-permeable belts defining said feed zone are integral with said gas-permeable belts defining said densifying zone.

8. The method of claim 1 wherein the gaps between the opposed pairs of support rolls of the final two or three densifying stations located at the convergent discharge end of said densifying zone are essentially equal.

9. The method of any one of claims 1 through 8, inclusive, wherein the starting powder material is submicron fumed silica having an apparent density of no greater than about 25 kg/m$^3$ and wherein the densifying thereof is sufficient to result in a densified silica product having an apparent density of at least about 100 kg/m$^3$.

* * * * *